Patented June 26, 1934

1,964,444

UNITED STATES PATENT OFFICE 1,964,444

PROCESS FOR DESTROYING THE STABILITY OF EMULSOIDS

Oliver M. Urbain, Columbus, Ohio, assignor to Charles H. Lewis, Harpster, Ohio

No Drawing. Application May 11, 1931, Serial No. 536,697

2 Claims. (Cl. 210—2)

This invention relates to the provision of a process for destroying the stability of emulsoids more especially in solutions. In its more specific aspect, the invention contemplates treating a slightly acid solution to destroy the stability of and remove therefrom emulsoids which carry positive electric charges.

The term "emulsoid" as employed herein, is intended to designate a solvated colloid.

Emulsoids are exceedingly stable, and their stability is due to two important factors, namely; first, the surface film of water which envelops the emulsoid and is tenaciously adsorbed thereby; and, second, the electrical charge carried by the emulsoid. When water solution is faintly acid, the emulsoids are positively charged. To destroy the stability of the emulsoids it is necessary not only to eliminate the adsorbed water film, but also to neutralize the internal potential.

In sewage as in all other organic wastes the emulsoid content is high and represents the greatest portion of the putrescible content as measured by the B. O. D. The source of the emulsoids contained in such wastes is in the proteins, carbohydrates and other complicated organic compounds, products of animal and plant life. These substances split up when attacked by bacteria into other organic compounds the most of which are unsaturated. This phenomenon is called cleavage. We may then say that the bulk of the organic matter in a decomposed sewage consists of the cleavage products of the proteins, carbohydrates, etc. When a protein undergoes proteolysis the clevage products are mostly the amino acids, which are unsaturated.

The molecules of all unsaturated compounds are polar, that is, unsymmetrical, and possess free valences. The power to combine or chemical activity of such molecules depend on their numbers of free valences and it is their power or activity which is responsible for their group together to form the larger units called emulsoids. The component parts of the emulsoids would individually pass freely through a collodion membrane while the larger unit made up of the molecules will not pass through such a membrane. Thus the conclusion is reached that the emulsoids are made up of unsaturated molecules derived from the cleavage of the proteins, carbohydrates, etc., by the action of bacteria on such substances. The unsaturated molecules combine into the larger units due to the attraction of the free valences of one for the other. The sum activity of these resulting units (emulsoids) will then depend on the free valences remaining after the combinations are effected. It has been determined that during the formation of these units the free or unsatisfied valences are oriented on the surface or outer boundary of the units, while the satisfied valences are inward. The centers of the positive and negative charges do not coincide and there results as a consequence a small electrostatic moment which in addition to the hydration factor stabilizes the unit as a solvated colloid.

All emulsoids formed in decomposing organic wastes are made up of unsaturated molecules of one form or another. It is the power of the free valences of such unsaturated molecules which enables them or forces them into the larger combinations or emulsoids. If the molecules were saturated they would have absolutely no attraction for each other and would remain simply as individual molecules and after the cleavage of the organic matter in sewage by the bacteria there would be no emulsoids. On the contrary the emulsoid content of sewage increases with its bacterial decomposition. This is the reason why the quick B. O. D. (biochemical oxygen demand) of putrid sewage is greater than that of the same sewage when it is fresh.

Since the emulsoid unit has free valances it follows that it will have attraction for many of the unsaturated compounds. By employing polar molecules and selecting the ones an end of which is immiscible with water, it can be appreciated that one can orient on the surface boundary of the emulsoid a layer of molecules the exposed surface of which will not be wetted by water and consequently eleminate the hydration factor of the emulsoid. The attraction of the emulsoid for such molecules will be very great due to the free valences of each. If it were possible to add exactly the proper polar molecules in the exact proper number it would be possible to exactly coincide the centers of the positive and negative charges and eliminate the electrostatic moment and thus discharge the emulsoid at the same time its hydration factor is being eliminated, and its entire stability be thus destroyed at one stroke.

It is, however, impracticable to attempt such accurate control and it is, therefore, preferable to merely convert the emulsoids into suspensoids and then flocculate the suspensoids by an electrolyte, the ion of opposite charge to that of the suspensoids having as high a valence as possible.

The present invention accordingly embraces the addition to the solution containing emulsoids of unsaturated molecules, one end or portion of which is immiscible with water to be oriented on the surface of the emulsoids and effectively displace the water film and dehydrate the emulsoids, transforming them into suspensoids. The suspensoids are then flocculated by the addition of the electrolyte and the flocculated mass may be removed by sedimentation, filtration, or by a coagulant capable of functioning under a low pH range.

Molecules which contain a polar group such as OH, COOH, CHO or SCN are well suited for use in this process. Any of the soluble or partly soluble monobasic acids conforming to the general formula $C_nH_{2n-2}O_2$ are especially suited as they combine the unsaturated phase with the immiscible end. They are comparatively cheap products and very plentiful.

Some examples of the monobasic acids are acrylic, crotonic, alpha, crotonic beta, angelic and tiglic.

Electrolytes adapted to effect flocculation of suspensoids formed in the manner above outlined should have a cation of low valence and an anion of high valence. $Na_3(PO_4)$; $K_3(PO_4)$; $Na_4Fe(CN)_6$; $Na_3VO_4$, are exemplary of such electrolytes, the cation of each of which has a valence of 1 and the anion a valence of 3 or 4.

When it is desired to effect coagulation of the flocculated mass, suitable coagulants for that purpose are aluminum sulphate and ferrous sulphate.

In carrying out the process the solution to be treated should be slightly acid; that is, it should have a pH within the range of say pH 5.5 to pH 6.8. Unsaturated molecules are then added to the solution until further addition thereof produces no additional turbidity. The solution can then be agitated and the electrolyte, for example, tri-sodium phosphate, added.

The treating agents may be employed in amount depending upon the concentration of the emulsoids in the water solution. Ordinarily substantially .20 gram of added molecules per liter of the solution will be sufficient while usually .15 gram of the electrolyte per liter will be found adequate to effect complete destruction of the stability of the emulsoids. The solution should be agitated both following the addition of the unsaturated molecules and the addition of the electrolyte.

Having thus described my invention, what I claim is:—

1. A process for destroying the stability of emulsoids in water solutions including the step of introducing to the solution a monobasic acid conforming to the general formula $C_nH_{2n-2}O_2$ and which is at least partially soluble therein.

2. A process for destroying the stability of emulsoids in water solutions including the step of introducing to the solution a soluble monobasic acid conforming to the general formula $C_nH_{2n-2}O_2$, and the additional steps of incorporating a suitable coagulant.

OLIVER M. URBAIN.